United States Patent [19]

Nash et al.

[11] 4,181,967

[45] Jan. 1, 1980

[54] DIGITAL APPARATUS APPROXIMATING MULTIPLICATION OF ANALOG SIGNAL BY SINE WAVE SIGNAL AND METHOD

[75] Inventors: Harold G. Nash, Tempe, Ariz.; John R. Linford, Broomfield, Colo.

[73] Assignee: Motorola, Inc., Schaumburg, Ill.

[21] Appl. No.: 925,680

[22] Filed: Jul. 18, 1978

[51] Int. Cl.² .................... G06F 15/34; G06F 7/52
[52] U.S. Cl. .................... 364/724; 324/78 D; 324/79 D; 328/134; 328/138; 364/754
[58] Field of Search .............. 364/724, 754, 757; 324/78 D, 79 D; 328/134, 138

[56] References Cited

U.S. PATENT DOCUMENTS

| | | | |
|---|---|---|---|
| 3,636,446 | 1/1972 | Genter et al. | 328/138 X |
| 3,803,390 | 4/1974 | Schaepman | 364/724 |
| 3,820,021 | 6/1974 | Clarisse | 324/79 D X |
| 3,912,916 | 10/1975 | Grün et al. | 364/724 |
| 4,021,653 | 5/1977 | Sharp et al. | 364/724 |
| 4,121,295 | 10/1978 | Witt | 364/724 |
| 4,125,900 | 11/1978 | Betts | 364/724 |

Primary Examiner—David H. Malzahn
Attorney, Agent, or Firm—Marvin A. Glazer

[57] ABSTRACT

A method and an apparatus are disclosed which employ digital techniques to approximate a multiplication of an analog signal by a sine wave of an appropriate frequency for detecting the analog signal. The analog signal is converted to a digital representation which includes a binary sign bit and a plurality of binary magnitude bits. The sign bit of the digital representation is selectively complemented by an inverting logic gate which operates under the control of a square wave having the appropriate frequency of the sine wave which is being approximated. The selective complementation of the sign bit of the digital representation functions to multiply the digital representation by +1 or −1 as determined by the status of the square wave signal. The resulting digital representation is latched at periodic intervals for further processing of the detected signal which results from the quasi digital multiplication.

8 Claims, 3 Drawing Figures

4,181,967

DIGITAL APPARATUS APPROXIMATING MULTIPLICATION OF ANALOG SIGNAL BY SINE WAVE SIGNAL AND METHOD

CROSS REFERENCES TO RELATED APPLICATIONS

1. "Digital Carrier Correction Circuit," invented by Harold Garth Nash and Gene Arnold Schriber, bearing Ser. No. 748,028, filed on Dec. 6, 1976 and assigned to the assignee of the present invention.

2. "Low Pass Digital Averaging Filter," invented by Harold Garth Nash, bearing Ser. No. 925,719, filed on even date herewith and assigned to the assignee of the present invention.

BACKGROUND OF THE INVENTION

1. Field of the Invention

The present invention relates generally to the detection of an analog signal and more particularly to the use of a digital technique for approximating the multiplication of an analog signal by a predetermined sine wave signal.

2. Description of the Prior Art

In many electronic applications, a modulated analog signal must be detected. For example, correlation receivers utilize multiplication or mixing to provide signal detection. Conventional linear multipliers, which receive the analog input signal as well as a locally generated sine wave signal and provide the analog product of these signals, are well known in the art. Digital techniques are also known in the prior art wherein the analog input signal is represented at specific points of time as a digital word having n number of binary magnitude bits plus a sign bit. Typically, a sine wave of the appropriate frequency, which is to be multiplied with the incoming analog signal, is stored in a read-only-memory as a plurality of digital words, each having n number of binary magnitude bits plus a sign bit. Serial or parallel digital multiplication is used to produce a digital product having 2n number of binary magnitude bits plus a sign bit.

This prior art technique for digital multiplication, while being suitable for implementation with integrated circuit technology, suffers from several disadvantages. First the logic circuitry necessary to perform the digital multiplication is inherently complex, and the large number of devices required to perform the multiplication significantly increases integrated circuit chip area. Secondly, the speed at which the multiplication can be performed is limited by the complexity of the digital multiplication circuitry, particularly as the bit length of the digital words is increased. Also, the register for holding the result of the digital multiplication must be twice the bit length of the digital words input to the multiplier. Furthermore extra chip area is required to store the predetermined digital values which represent the sine wave to be multiplied with the incoming analog signal. It will be appreciated by those skilled in the art that a quasi digital multiplier which approximates the operation of the previously described digital multiplier while eliminating the recited disadvantages of prior art digital multiplication is a significant improvement over the prior art.

SUMMARY OF THE INVENTION

An object of the present invention is to approximate the multiplication of an analog input signal by a sine wave of a selected frequency using digital techniques.

Another object of the present invention is to provide a multiplier for detecting an analog signal which may easily be fabricated with conventional integrated circuit technology.

It is a further object of the present invention to provide a digital multiplier for detecting an analog signal which requires less chip area and which allows a higher speed of operation than prior art digital multipliers while providing sufficient accurary to detect the analog signal.

The present invention relates to a method and an apparatus for performing signal detection of an analog waveform using digital techniques and including converter circuitry for converting the analog waveform to a first digital representation which has an associated polarity and magnitude, circuitry for providing a square wave signal, and logic circuitry for converting the first digital representation to a second digital representation wherein the second digital representation also has an associated polarity and magnitude. The magnitude of the second digital representation corresponds to the magnitude of the first digital representation, while the polarity of the second digital representation is controlled by the status of the square wave signal. When the square wave signal is in a first logic state, the polarity of the second digital representation equals the polarity of the first digital representation. However when the square wave signal is in a second logic state, the polarity of the second digital representation is the opposite of the polarity of the first digital representation. The quasi digital multiplier thus serves to multiply the first digital representation by +1 or −1 as determined by the status of the square wave signal. The frequency of the square wave signal is selected to be equal to the frequency of the sine wave signal which is being approximated. In the preferred embodiment of the invention, storage circuitry is provided for latching the second digital representation during periodic sampling intervals.

DESCRIPTION OF THE PREFERRED EMBODIMENT

Figure 1:
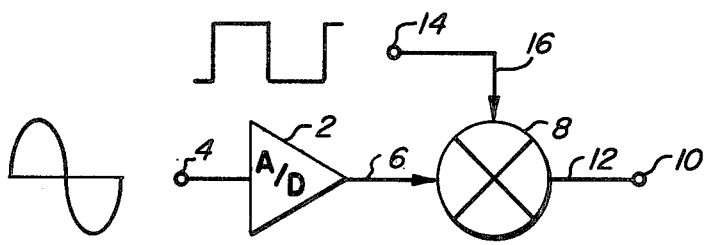
FIG. 1 is a block diagram which illustrates one embodiment of the invention.

In FIG. 1, a preferred embodiment of the invention is illustrated in block diagram form. Analog to digital converter 2 includes an input terminal 4 for receiving the analog input waveform from which a signal is to be detected. Analog to digital converter 2 provides a first digital representation of the received analog input waveform to conductor 6. The first digital representation output by analog to digital converter 2 consists of a plurality of binary bits which represent the polarity and the magnitude of the received analog input waveform. Although the output of analog to digital converter 2 is shown as being coupled to a single conductor 6 for the ease of illustration, those skilled in the art will realize that conductor 6 symbolizes a plurality of lines for conducting the binary signals which in combination from the digital representation. Conductor 6 couples the output of analog to digital converter 2 to multiplier 8 which provides a second digital representation to output terminal 10 via conductor 12. Multiplier 8 includes an input terminal 14 for receiving a square wave signal via conductor 16.

Figure 2:
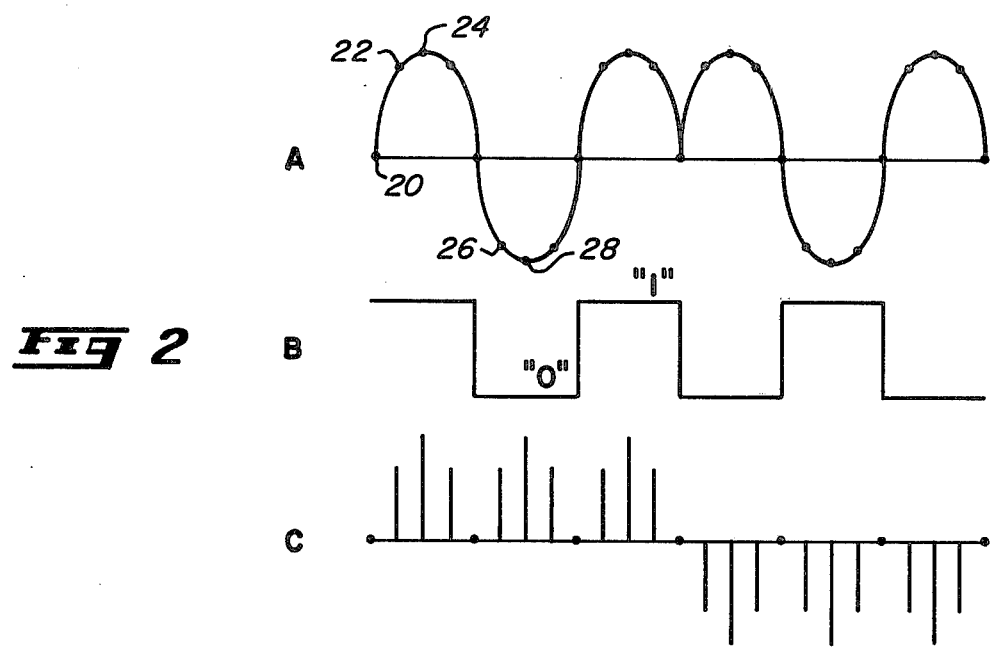
FIG. 2A illustrates an analog input signal having an underlying frequency and which is sampled at 45 degree intervals.
FIG. 2B is a square wave pulse to be multiplied with the analog input wave form.
FIG. 2C graphically illustrates the product of the multiplication at the periodic sampling intervals.

The operation of the quasi digital multiplier shown in FIG. 1 will be described with reference to the waveforms shown in FIG. 2. Waveform A illustrates the analog input waveform which might be received at input terminal 4 of analog to digital converter 2. Waveform A might represent an analog waveform transmitted by a differential phase shift keyed (DPSK) modulator such that a phase shift of a 180° has been indicated midway through the waveform. Such an application is discussed in co-pending application Ser. No. 748,028, "Digital Carrier Correction Circuit" hereinbefore mentioned. It is assumed that the analog input waveform will be sampled at each 45° interval as indicated by dots 20, 22 and 24 on waveform A. It will be further assumed for example purposes only that analog to digital converter 2 outputs a 7-bit digital word wherein the most significant bit is a sign bit and the remaining 6 bits denote a magnitude. Thus at sample time 20, the output of analog to digital converter 2 is 0000000, in order to indicate a positive polarity and a zero magnitude. At sample time 24, the output of analog to digital converter 2 is 0111111, the most significant bit or sign bit being a zero to indicate a positive polarity while the remaining bits are all 1's to indicate the maximum magnitude. At sample time 22, the output of analog to digital converter 2 might be 0101101 to indicate a positive polarity and a magnitude between zero and maximum. Similarly, at sample times 26 and 28, the output of analog to digital converter 2 would equal 1101101 and 1111111, respectively. In both cases the sign bit is a one to indicate a negative polarity.

Waveform 2B illustrates a square wave of a frequency equal to the underlying frequency of waveform A. As is known to those skilled in the art, maximum signal detection is provided by multiplying waveform A by a sine wave signal having a frequency equal to the underlying frequency of waveform A. However, the square wave signal shown in waveform B can be used to approximate a sine wave signal and still provide adequate signal detection in many applications.

Multiplier 8 allows the sign bit of the digital representation output by analog to digital converter 2 to be passed unmodified to output terminal 10 whenever waveform B is at a logic "1" or high level. However, multiplier 8 causes the sign bit to be inverted whenever waveform B is at a logic "0" or low level. Therefore, multiplier 8 multiplies the output of analog to digital converter 2 by +1 whenever waveform B is at a logic "1" level and by −1 whenever waveform B is at a logic "0" level. The product output by multiplier 8 is illustrated graphically in waveform C wherein the direction and length of each line segment corresponds to the polarity and magnitude of the digital product output by multiplier 8 at each sample time. In a particular application, the output shown in waveform C might be smoothed by a low pass digital averaging filter to provide a detected signal. A low pass digital averaging filter suitable for such an application is described in co-pending application Ser. No. 925,719 "Low Pass Digital Averaging Filter" hereinbefore mentioned.

Figure 3:
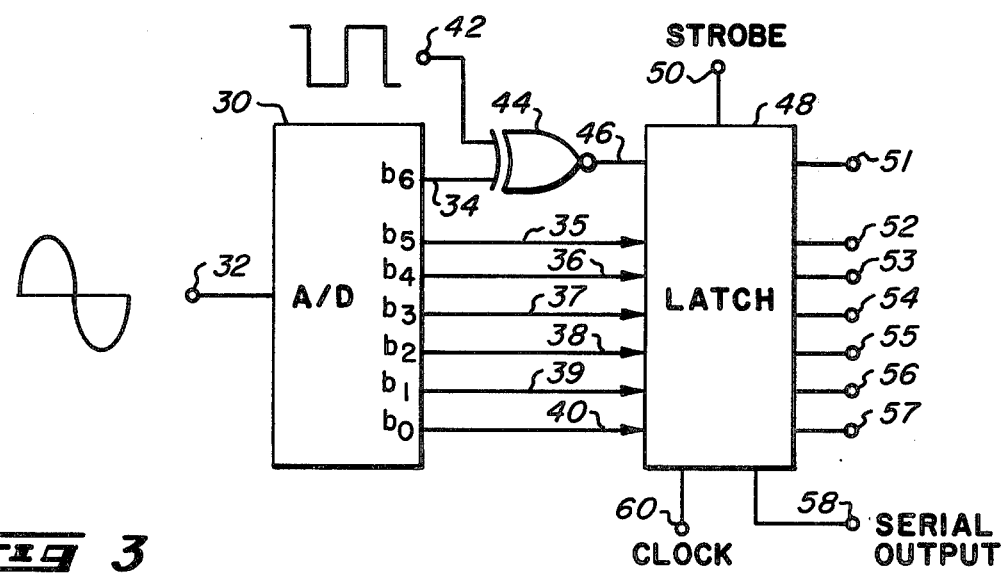
FIG. 3 is a more detailed block diagram of the preferred embodiment of the invention illustrated in FIG. 1.

In FIG. 3, the preferred embodiment of the invention is illustrated in greater detail. Analog to digital converter 30 receives the analog input waveform at terminal 32 and provides a 7-bit output ($b_6b_5b_4b_3b_2b_1b_0$) on conductors 34 through 40. In the preferred embodiment, output $b_6$ provides a binary sign bit to conductor 34, while output bits $b_5$ through $b_0$ provide the magnitude to conductors 35 through 40, such that signal $b_0$ is the least significant binary bit. A square wave signal is received by terminal 42 which is coupled to a first input of EXCLUSIVE-NOR gate 44. The second input of gate 44 is coupled to conductor 34 for receiving the sign bit output by analog to digital converter 30, and the output of gate 44 is coupled to conductor 46. As is well known to those skilled in the art, the output of gate 44 is a logic "1" whenever the logic state at input terminal 42 matches the logic state on conductor 34, while the output of gate 44 is a logic "0" whenever the logic states at input terminal 42 and conductor 34 differ from each other. Thus, if input terminal 42 is a logic "1", the output of gate 44 will be equal to the logic level of the sign bit provided by analog to digital converter 30. However, when input terminal 42 is a logic "0", the output of gate 44 will be the complement of the sign bit provided by analog to digital converter 30.

Conductors 35 through 40 and conductor 46 are coupled to latch circuit 48 which, in this example, has seven storage locations for storing the seven binary bits. A strobe terminal 50 receives a strobe pulse for causing the latch circuit 48 to store the magnitude bits presented by conductors 35 through 40 and the sign bit provided by conductor 46. With reference to waveform A, the strobe input 50 is pulsed at each of the sampling times.

Latch circuit 48 may be of the type which provides a parallel output. In this event, output terminals 51 through 57 would provide a digital output corresponding to the digital value most recently strobed into latching circuit 48. Latching circuit 48 may also be of a serial output type, as for example, a shift register. In this case, an output terminal 58 may be provided for serially shifting out the seven binary bits most recently strobed into latching circuit 48. A clock signal would then be applied to input terminal 60 for synchronizing the shifting out of the binary bits stored in latching circuit 48.

Thus, multiplier 8 in FIG. 1 is simply an EXCLUSIVE-NOR gate 44 in FIG. 3. The complexity of the digital multiplication is greatly reduced and the resultant word bit length is identical to that provided by the ouput of the analog to digital converter 30. Since the digital multiplication operation modifies only the sign bit and since the sign bit modification is accomplished with a simple EXCLUSIVE-NOR gate, the speed of operation at which the digital multiplication can be performed is greatly increased over prior art digital multiplication approaches. Furthermore, a square wave signal can easily be provided if a timing signal of the appropriate frequency has already been established.

Although the preferred embodiment has assumed a digital representation in sign-magnitude binary format, the invention may be adapted to employ other binary coding schemes. For example, referring to FIG. 1, analog to digital converter 2 may be adapted to output a digital representation in two's-complement notation, and multiplier 8 may be adapted to pass the digital representation unmodified when the square wave input signal is a logic "1" while the causing the two's-complement of the output of analog to digital converter 2 to be output on terminal 10 when the received square wave signal is a logic "0".

While the invention has been described with reference to a preferred embodiment, the description is for illustrative purposes only and is not to be construed as limiting the scope of the invention. Various modifications and changes may occur to those skilled in the art without departing from the true spirit and scope of the invention as defined in the appended claims.

What is claimed is:

1. A quasi digital multiplier for approximating multiplication of an analog waveform by a sine wave signal of a predetermined frequency, comprising:
    (a) converter means responsive to the analog waveform for providing a first digital representation of the analog waveform, the first digital representation having a polarity and a magnitude which correspond to the analog waveform;
    (b) means for receiving a binary valued signal having a clock period corresponding to said predetermined frequency, the binary valued signal being in a first logic state during a first half of the clock period and being in a second logic state during a second half of the clock period; and
    (c) logic means coupled to the converter means and coupled to the receiving means for providing a second digital representation, the second digital representation being equal to the first digital representation when the binary valued signal is in the first logic state, and the second digital representation being of the magnitude of the first digital representation but of a polarity opposite to the polarity of the first digital representation when the binary valued signal is in the second logic state.

2. A quasi digital multiplier as recited in claim 1 wherein said converter means provides the first digital representation as a first binary sign bit and a plurality of binary magnitude bits such that the first sign bit and the plurality of magnitude bits represent the polarity and the magnitude, respectively, of the analog waveform.

3. A quasi digital multiplier as recited in claim 2 wherein said logic means includes gating means responsive to the first sign bit and responsive to the binary valued signal for providing a second sign bit, the second sign bit being equal to the first sign bit when the binary valued signal is in the first logic state and being equal to the binary complement of the first sign bit when the binary valued signal is in the second logic state.

4. A quasi digital multiplier as recited in claim 1 wherein said receiving means receives the binary valued signal as a square wave pulse.

5. A quasi digital multiplier as recited in claim 1 further comprising storage means coupled to the logic means for sampling the second digital representation during periodic sampling intervals, said storage means being responsive to the second digital representation and to a timing signal for storing the second digital representation during each sampling interval.

6. A method of multiplying an analog signal to provide signal detection, comprising the steps of:
    (a) converting the analog signal to a first digital representation, the first digital representation having a polarity and a magnitude which correspond to the analog signal;
    (b) providing a square wave signal of a predetermined frequency and having first and second levels;
    (c) converting the first digital representation to a second digital representation having a magnitude equal to the magnitude of the first digital representation, and having a polarity which is equal to the polarity of the first digital representation when the square wave signal is equal to the first level and which is of an opposite polarity to that of the first digital representation when the square wave signal is equal to the second level; and
    (d) sampling the second digital representation at periodic intervals of time.

7. A method as recited in claim 6 wherein said sampling step includes storing the second digital representation in a storage circuit at periodic intervals of time.

8. A method as recited in claim 6 wherein said step of converting the analog signal includes the step of providing a sign bit which indicates the polarity of the first digital representation and wherein the step of converting the first digital representation includes the step of providing a second sign bit which equals the first sign bit when the square wave signal is equal to the first level, and which equals the binary complement of the first sign bit when the square wave signal is equal to the second level.

* * * * *